United States Patent
Shima

(10) Patent No.: US 7,301,737 B2
(45) Date of Patent: Nov. 27, 2007

(54) MOTOR POWER LINE BREAK DETECTION METHOD IN AC SERVO DRIVER

(75) Inventor: Naoki Shima, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/553,296

(22) PCT Filed: Apr. 16, 2004

(86) PCT No.: PCT/JP2004/005473

§ 371 (c)(1),
(2), (4) Date: Nov. 13, 2006

(87) PCT Pub. No.: WO2004/093302

PCT Pub. Date: Oct. 28, 2004

(65) Prior Publication Data

US 2007/0064359 A1    Mar. 22, 2007

(30) Foreign Application Priority Data

Apr. 18, 2003    (JP) .............................. 2003-114206

(51) Int. Cl.
*H02H 7/08* (2006.01)
(52) U.S. Cl. .............................. 361/31; 361/23; 361/1; 318/800; 318/434; 318/432
(58) Field of Classification Search ...................... None
See application file for complete search history.

(56) References Cited

U.S. PATENT DOCUMENTS

| | | | |
|---|---|---|---|
| 5,376,868 A * | 12/1994 | Toyoda et al. .............. 318/587 |
| 5,623,190 A * | 4/1997 | Tajima et al. ................ 318/800 |
| 5,835,872 A * | 11/1998 | Matsuoka et al. ............ 701/41 |
| 6,426,633 B1 * | 7/2002 | Thybo ........................ 324/511 |
| 6,906,492 B2 * | 6/2005 | Matsushita ................... 318/727 |
| 7,098,624 B2 * | 8/2006 | Kusaka ........................ 318/727 |
| 7,215,518 B2 * | 5/2007 | Matsumoto et al. .......... 361/23 |
| 2003/0058589 A1 * | 3/2003 | Matsumoto et al. .......... 361/23 |

FOREIGN PATENT DOCUMENTS

| | | |
|---|---|---|
| EP | 1 292 012 A2 | 3/2003 |
| JP | 5-137380 A | 6/1993 |
| JP | 9-145893 A | 6/1997 |
| JP | 9-172791 A | 6/1997 |
| JP | 11-332002 A | 11/1999 |

\* cited by examiner

*Primary Examiner*—Lincoln Donovan
*Assistant Examiner*—Renata McCloud
(74) *Attorney, Agent, or Firm*—Sughrue Mion, PLLC

(57) ABSTRACT

An object of the invention is to provide a break detection method capable of lessening a delay of motor power line break detection.

According to the invention, in a motor power line break detection method of an AC servo driver including a current detector and a torque controller, a torque current component 9 is extracted from a three-phase AC detected by current detector 4, 5, a comparison is made between a torque command 1 and the torque current component 9, and if the difference between the torque command and the torque current component exceeds a setup value 21, it is recognized that a motor power line is broken.

4 Claims, 4 Drawing Sheets

MOTOR POWER LINE BREAK DETECTION METHOD IN AC SERVO DRIVER

TECHNICAL FIELD

This invention relates to a detection method when a motor power line is broken in an AC servo driver.

BACKGROUND ART

Hitherto, "Failure Detecting Device for AC Motor Control Circuit" for example, disclosed in patent document 1 is named as a break detector of a motor.

FIG. 3 is a system configuration diagram of an AC motor control circuit known in JP-A-9-172791 for detecting an anomaly of a current sensor, etc., in a circuit for supplying power from a battery 112 to a three-phase AC motor 110.

In the figure, a controller 116 for controlling the operation of an IPM 114 contains a CPU 118, ROM 120, RAM 122, an I/O port 124, and an A/D converter 126, the ROM 120 stores a control program to be executed by the CPU 118, fixed parameters, etc., and the RAM 122 provides a work area for the CPU 118. The I/O port 124 and the A/D converter 126 are each means for inputting external digital or analog information. Here, the torque command value indicating the torque to be output from the motor 110 and output of a resolver 128 added to the motor 110 for generating a signal in response to rotation of a rotator of the motor are input from the I/O port 124. The A/D converter 126 converts outputs ius, ivs, and iws of current sensors 130u, 130v, and 130w provided corresponding to the three phases of the motor 110 from analog form into digital form for input to the controller 116.

The CPU 118 supplies a control signal to the IPM 114 so that the torque corresponding to the torque command value is output from the motor 110. At the time, the CPU 118 detects the output signal of the resolver 128 (the number of revolutions or the rotation angle) and the outputs ius, ivs, and iws of the current sensors 130u, 130v, and 130w (phase current instantaneous values) and when the CPU 118 makes a transition to an anomaly detection routine during usual operation control, the CPU 118 finds estimated values of phase currents, iuc, ivc, and iwc, from phase voltage command values and makes a comparison between deviation from the phase output current value ius, ivs, iws, |iuc-ius|, |ivc-ivs|, |iwc-iws|, and threshold value $\Delta I1u$, $\Delta I1v$, $\Delta I1w$ for determining an anomaly.

Another inspection device is "Motor Controller" disclosed in JP-A-5-137380. FIG. 4 is a circuit diagram thereof. A control circuit 207a controls a drive circuit 205 and operates upon reception of a motor start command 210 and before a motor is started, gives a break detection command 213 to a break detection circuit 212 and checks whether or not circuit is abnormal according to an overcurrent detection signal. If no anomaly is detected, the control circuit starts a motor 201; if an anomaly is detected, the control circuit stops starting the motor 201. In this case, a break detection signal 214 of the break detection circuit 212 is provided for conducting an energization test of each phase by applying a direct current; in the energized phase, an uncontrolled direct current flows unless an anomaly exists in the path, and thus an overcurrent state is entered and this fact is used to detect an overcurrent.

In the related art described above, however, a motor break cannot directly be detected and a speed detection value does not follow a speed command value due to a motor break and consequently the torque command becomes a large value. As the torque command value continues to take a large value, it is detected as an overload alarm and thus for the anomaly detection shown in the patent document, the delay time in the anomaly detection during the operation is large and the moving part of a machine incorporating a motor may run away, causing damage to the machine; this is a problem.

Since a break in a power line cannot rapidly be detected before the operation, if the motor power line for driving a vertical axis is broken, a workpiece drops after a mechanical brake is released; this is also a problem.

It is therefore an object of a first aspect of the invention to provide a motor power line break detection method of an AC servo driver capable of immediately detecting the presence or absence of a break in a motor power line during the operation and stopping a machine with safety before causing damage to the machine.

Further, it is an object of a second aspect of the invention to provide a motor power line break detection method of an AC servo driver capable of detecting the presence or absence of a break in a motor power line with safety while a mechanical brake is held before the operation and preventing a workpiece from dropping without releasing the mechanical brake if a break is detected.

DISCLOSURE OF THE INVENTION

To accomplish the above-described object, according to invention 1, there is provided a motor power line break detection method of an AC servo driver including: a current detector; and a torque controller, the method including the steps of: extracting a torque current component from a three-phase AC detected by the current detector, comparing a torque command with the torque current component, and recognizing that a motor power line is broken, if the difference between the torque command and the torque current component exceeds a setup value.

According to invention 2, there is provided a motor power line break detection method of an AC servo driver including: a current detector; and a torque controller, the method including the steps of: applying a three-phase AC voltage so as to allow a magnetizing current not generating a torque in a motor to flow, detecting the consequent current flowing into the motor by the current detector, extracting a magnetizing current component, comparing the magnetizing current component with the commanded magnetizing current, and recognizing that a motor power line is broken, if the difference between the magnetizing current and the magnetizing current component exceeds a setup value.

According to Invention 3, it is characterized in that if it is recognized that the motor power line is broken, application output from a power converter to a motor is shut off, and a brake mechanism is actuated to stop the motor.

According to Invention 4, it is characterized in that if it is recognized that the motor power line is broken, a mechanism brake is not released and the motor is not started.

According to the motor power line break detection method of the AC servo driver, in break inspection while the motor is operating, the difference between torque current command Iqref and torque current detection value Iqfb is compared with the setup value and whether or not the motor power line is broken is determined, so that it is made possible to take later safety measures by rapid break detection.

Alternatively, in break inspection in a motor stop state before the operation, a d axis current is used and a d axis current not generating a torque in the motor is caused to flow, the difference between d axis current command Idref and d axis current detection value Idref is compared with the setup value and whether or not the motor power line is broken is determined, so that break inspection before the operation with the mechanical brake held can be conducted with safety.

Figure 1:
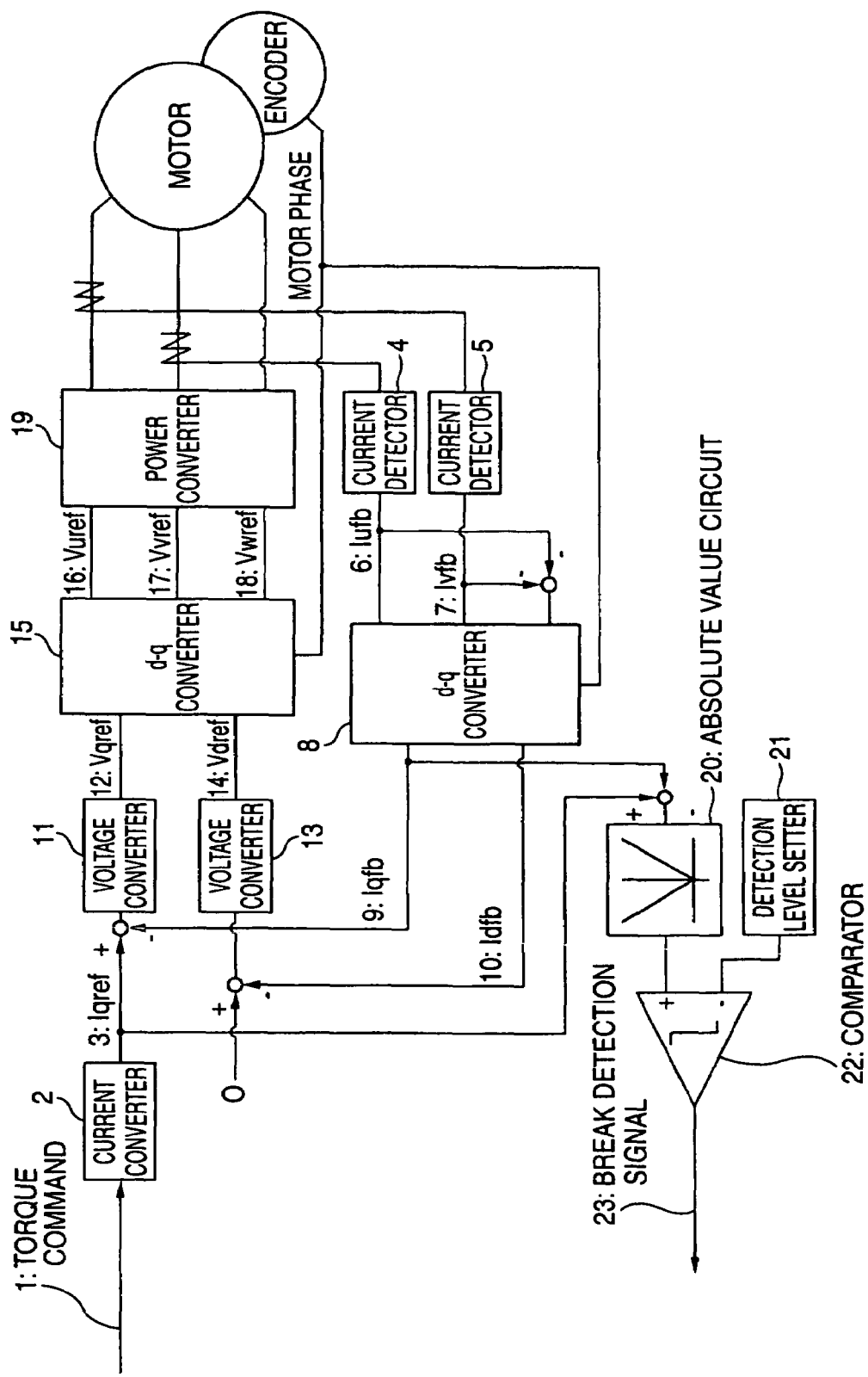
FIG. 1 is a block diagram to show the configuration of an AC servo driver incorporating a motor power line break detection method according to invention 1.

The reference numerals in the figures are as follows: 1 denotes a torque command, 2 denotes a current converter, 3 denotes qref, 4 denotes a current detector, 5 denotes a current detector, 6 denotes Iufb, 7 denotes Ivf, 8 denotes a d-q converter, 9 denotes Iqfb, 10 denotes Idfb, 11 denotes a voltage converter, 12 denotes Vqref, 13 denotes a voltage converter, 14 denotes Vdref, 15 denotes a d-q converter, 16 denotes Vuref, 17 denotes Vvref, 18 denotes Vwref, 19 denotes a power converter, 20 denotes an absolute value circuit, 21 denotes a detection level setter, 22 denotes a comparator, 23 denotes a break detection signal, 24 denotes a magnetizing current command generator, and 25 denotes dref.

BEST MODE FOR CARRYING OUT THE INVENTION

A first embodiment of the invention will be discussed with reference to the accompanying drawing.

FIG. 1 is a block diagram of a motor controller according to the first embodiment of the invention.

In FIG. 1, a torque command 1 is converted into Iqref3 by a current converter 2. A motor U phase current and V phase current are converted into Iufb6 and Ivfb7 by a current detector 4 and a current detector 5 respectively. Iufb6 and Iufb7 and the current provided by adding Iufb6 and Iufb7 and inverting the sign are converted into Iqfb9 and Iqfb10 by a d-q converter 8.

The difference between Iqref3 and Iqfb9 is converted into Vqref12 by a voltage converter 11. The current provided by inverting the sign of Idfb10 is converted into Vdref14 by a voltage converter 13.

Vqref12 and Vdref14 are converted by a d-q converter 15 into Vuref16, Vvref17, and Vwref18, which then are converted into a U phase voltage, a V phase voltage, and a W phase voltage respectively by a power converter 19 and the voltages are applied to a motor.

A comparator 22 makes a comparison between the absolute value of the difference between Iqref3 and Iqfb9, provided by an absolute value circuit 20 and a setup value of a detection level setter 21, and the comparison result is adopted as a break detection signal 23.

The operation is as follows:

If a motor power line is broken during the operation, a current does not flow into the motor and Iufb6 and Ivfb7 become zero and Iqfb9 also becomes zero. If the motor power line is broken, the controlled variable of a superior control loop of a speed controller, etc., changes and the torque command 1 output therefrom always becomes a value other than zero. Iqref3 also becomes a value other than zero. Therefore, a difference occurs between Iqref3 and Iqfb9 and the comparator 22 makes a comparison between the deviation absolute value output by the absolute value circuit 20 and the setup value of the detection level setter 21 preset to a predetermined value. If the deviation absolute value exceeds the setup value, the break detection signal 23 is output.

When the break detection signal is input to a superior control section, output of an inverter 19 is shut off and a brake is actuated to stop the motor.

Next, a second embodiment of the invention will be discussed based on the accompanying drawing.

Figure 2:
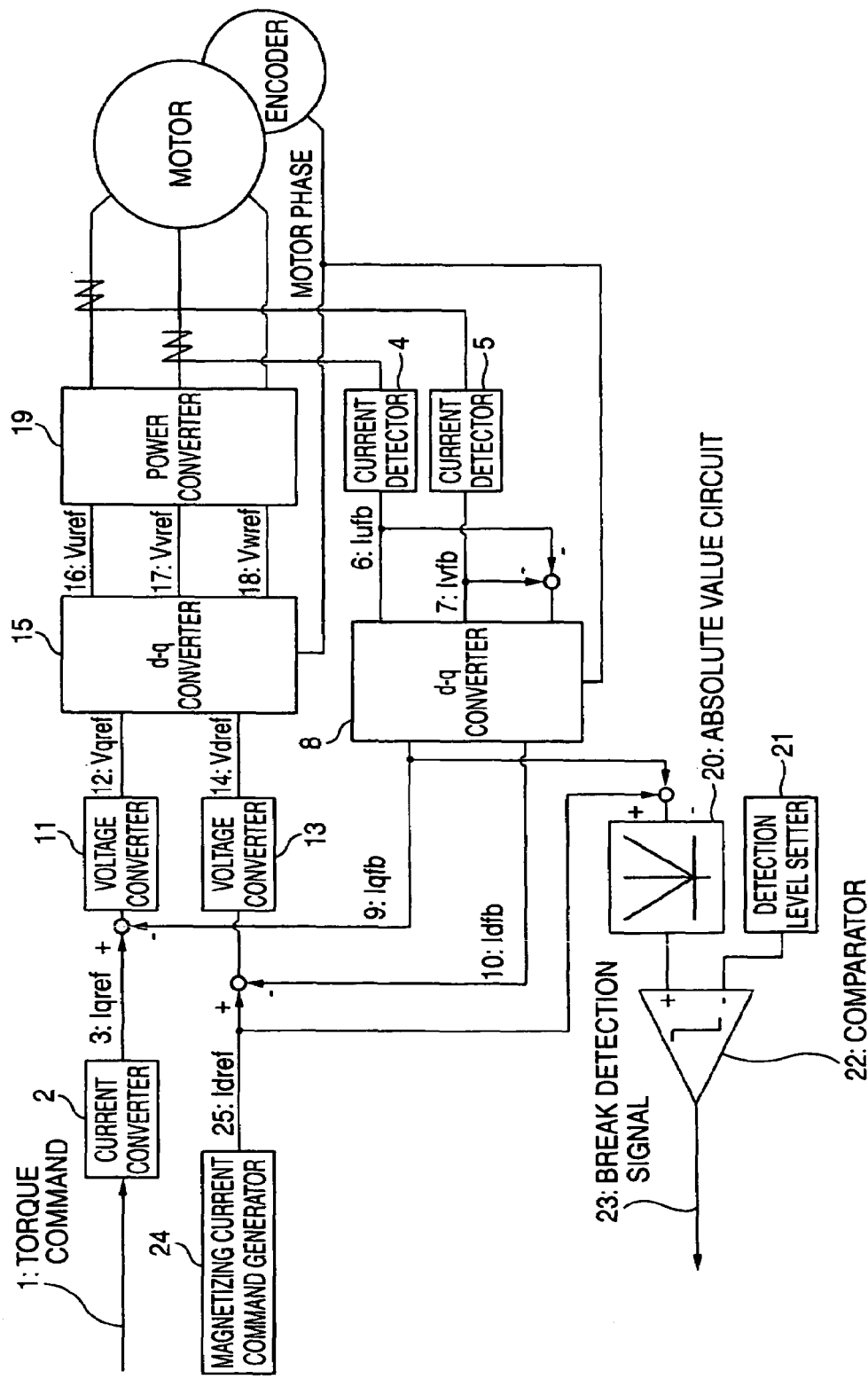
FIG. 2 is a block diagram to show the configuration of an AC servo driver incorporating a motor power line break detection method according to invention 2.
Figure 3:
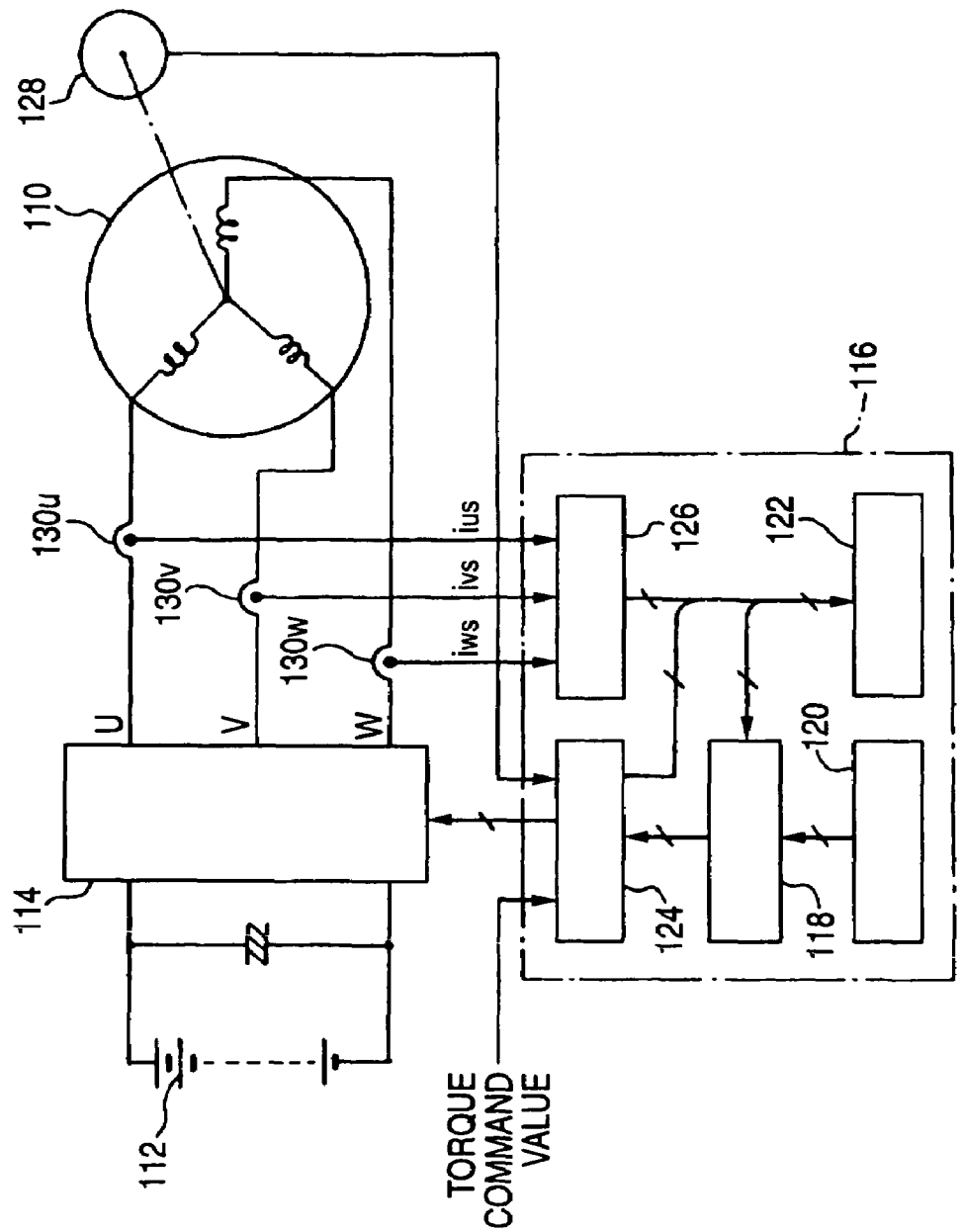
FIG. 3 is a configuration diagram of an anomaly detector of an AC motor control circuit in a related art.
Figure 4:
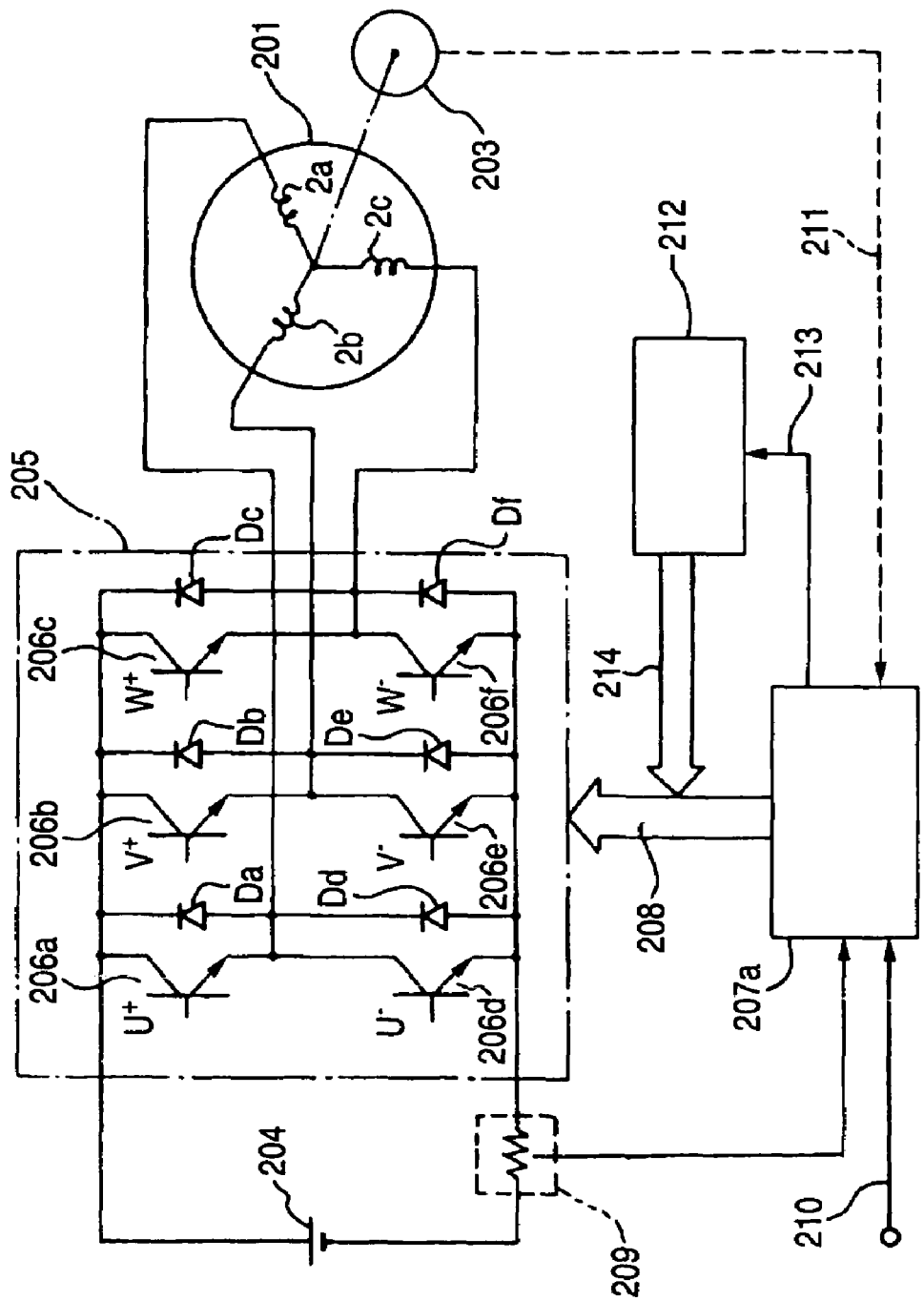
FIG. 4 is a circuit diagram of a motor controller in a related art.

FIG. 2 is a block diagram to show the configuration of an AC servo driver incorporating a motor power line break detection method according to the second embodiment of the invention.

In FIG. 2, a torque command 1 is converted into Iqref3 by a current converter 2. Idref25 is output by a magnetizing current command generator 24.

A motor U phase current and V phase current are converted into Iufb6 and Ivfb7 by a current detector 4 and a current detector 5 respectively. Iufb6 and Iufb7 and the current provided by adding Iufb6 and Iufb7 and inverting the sign are converted into Iqfb9 and Iqfb10 by a d-q converter 8.

The difference between Iqref3 and above-mentioned Iqfb9 is converted into Vqref12 by a voltage converter 11. The difference between Idref25 and Iqfb10 is converted into Vdref14 by a voltage converter 13.

Vqref12 and Vdref14 are converted by a d-q converter 15 into Vuref16, Vvref17, and Vwref18, which then are converted into a U phase voltage, a V phase voltage, and a W phase voltage respectively by a power converter 19 and the voltages are applied to a motor.

A comparator 22 makes a comparison between the absolute value of the difference between above-mentioned Idref25 and above-mentioned Iqfb10, provided by an absolute value circuit 20 and a setup value of a detection level setter 21, and the comparison result is adopted as a break detection signal 23.

The operation is as follows:

To allow a d axis current not generating a torque in the motor to flow before the operation, the current command Idref25 not zero driven away by the magnetizing current command generator 24 attempts to cause a current to flow into the motor through the voltage converter 13, the d-q converter 15, and the power converter 19. However, if a motor power line is broken, no current flows and the current detector 4 and the current detector 5 detect current zero. Idfb10 output through the d-q converter 8 also becomes zero. Therefore, a difference occurs between Idref25 and Idfb10 and the absolute value circuit outputs the absolute value of the difference. The comparator 22 makes a comparison between the absolute value and the setup value of the detection level setter 21. If the absolute value exceeds the setup value, the break detection signal 23 is output.

If the break detection signal 23 is not input, a superior control section releases a brake for starting the motor; if the break detection signal 23 is input, the superior control section holds the brake and does not start the motor.

INDUSTRIAL APPLICABILITY

As described above, according to the invention, a break in the motor power line is detected directly from the current detector, so that there is an advantage that it is made possible to lessen the break detection delay time and if the motor power line is broken, immediately it can be detected and the motor can be stopped with safety before the machine is damaged.

The presence or absence of a break in the motor power line can be detected while a mechanical brake is held before the operation, so that there is an advantage that if the line is broken, it is made possible not to release the mechanical brake and a workpiece can be prevented from dropping.

The invention claimed is:

1. A motor power line break detection method of an AC servo driver comprising: a current detector; and a torque controller, the method comprising the steps of:

extracting a torque current component from a three-phase AC detected by the current detector, comparing a torque command with the torque current component, and recognizing that a motor power line is broken, if the difference between the torque command and the torque current component exceeds a setup value.

2. A motor power line break detection method of an AC servo driver comprising: a current detector; and a torque controller, the method comprising the steps of:

applying a three-phase AC voltage so as to allow a magnetizing current not generating a torque in a motor to flow, detecting the consequent current flowing into the motor by the current detector, extracting a magnetizing current component, comparing the magnetizing current with the commanded magnetizing current, and recognizing that a motor power line is broken, if the difference between the magnetizing current and the magnetizing current component exceeds a setup value.

3. The motor power line break detection method of the AC driver as claimed in claim 1, wherein if it is recognized that the motor power line is broken, application output from a power converter to a motor is shut off, and a brake mechanism is actuated to stop the motor.

4. The motor power line break detection method of the AC driver as claimed in claim 2, wherein if it is recognized that the motor power line is broken, a mechanism brake is not released, and the motor is not started.

* * * * *